US012809542B2

(12) United States Patent
Ling et al.

(10) Patent No.: US 12,809,542 B2
(45) Date of Patent: Nov. 24, 2026

(54) METHOD, ELECTRONIC DEVICE AND COMPUTER PROGRAM PRODUCT FOR DATA REPLICATION

(71) Applicant: Dell Products L.P., Round Rock, TX (US)

(72) Inventors: Qinghua Ling, Beijing (CN); Xin Zhong, Beijing (CN); Fei Long, Shanghai (CN); Tianfang Xiong, Shanghai (CN); Minghui Zhang, Shanghai (CN); Rongrong Shi, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 411 days.

(21) Appl. No.: 18/382,161

(22) Filed: Oct. 20, 2023

(65) Prior Publication Data

US 2024/0338143 A1 Oct. 10, 2024

(30) Foreign Application Priority Data

Apr. 10, 2023 (CN) ......................... 202310377135.9

(51) Int. Cl.
*G06F 3/00* (2006.01)
*G06F 3/06* (2006.01)
(Continued)

(52) U.S. Cl.
CPC ............ *G06F 3/065* (2013.01); *G06F 3/0604* (2013.01); *G06F 3/0653* (2013.01); *G06F 3/067* (2013.01); *G06F 16/2358* (2019.01); *G06F 16/27* (2019.01)

(58) Field of Classification Search
CPC ...... G06F 3/065; G06F 3/0604; G06F 3/0653; G06F 3/067; G06F 16/2358; G06F 16/27; G06F 3/0638
See application file for complete search history.

(56) References Cited

U.S. PATENT DOCUMENTS 7,406,487 B1 * 7/2008 Gupta ..................... G06F 16/27
8,239,645 B1 * 8/2012 Sade ................... G06F 11/2074
711/E12.019

(Continued)

OTHER PUBLICATIONS

Steven White et al., "Synchronization and Overlapped Input and Output", Jan. 7, 2021, Microsoft https://learn.microsoft.com/en-us/windows/win32/sync/synchronization-and-overlapped-input-and-output (Year: 2021).*

(Continued)

*Primary Examiner* — Midys Rojas
(74) *Attorney, Agent, or Firm* — BainwoodHuang

(57) ABSTRACT

Techniques for data replication involve determining, based on a metadata log, whether an overlap exists between a target input/output operation or target IO and previous IOs, wherein the metadata log records metadata related to data replication. Such techniques further involve writing the target IO to a source data volume according to a determination that no overlap exists between the target IO and the previous IOs. Such techniques further involve replicating data within the range of the overlap from the source data volume to a data log according to a determination that the overlap exists between the target IO and the previous IOs, and writing the target IO to the source data volume after completion of the replicating. Such techniques further involve replicating the target IO to a target data volume based on the metadata log and the data log.

16 Claims, 7 Drawing Sheets

(51) Int. Cl.
*G06F 16/23* (2019.01)
*G06F 16/27* (2019.01)

(56) References Cited

U.S. PATENT DOCUMENTS

| | | | | |
|---|---|---|---|---|
| 11,294,777 | B2 | 4/2022 | Venkatesh et al. | |
| 11,704,238 | B1 * | 7/2023 | Pai | G06F 12/0871 711/103 |
| 11,803,571 | B2 | 10/2023 | Thomas et al. | |
| 2011/0099342 | A1 * | 4/2011 | Ozdemir | G06F 11/2074 711/E12.002 |
| 2019/0317858 | A1 | 10/2019 | Danilov et al. | |
| 2020/0104251 | A1 * | 4/2020 | Boals | G06F 12/0246 |
| 2020/0117547 | A1 | 4/2020 | Danilov et al. | |
| 2020/0133668 | A1 | 4/2020 | Chen et al. | |
| 2020/0201814 | A1 | 6/2020 | Danilov et al. | |
| 2020/0380044 | A1 | 12/2020 | Skripko et al. | |
| 2022/0197924 | A1 * | 6/2022 | Chen | G06F 11/2094 |

OTHER PUBLICATIONS

Douglas Comer, "The Ubiquitous B-Tree", Jun. 1979, Purdue University, (Year: 1979).*

DePaul University, "B-Trees: Balanced Tree Data Structures", Jul. 31, 2019 (Year: 2019).*

* cited by examiner

METHOD, ELECTRONIC DEVICE AND COMPUTER PROGRAM PRODUCT FOR DATA REPLICATION

CROSS-REFERENCE TO RELATED APPLICATION

This application claims priority to Chinese Patent Application No. CN202310377135.9, on file at the China National Intellectual Property Administration (CNIPA), having a filing date of Apr. 10, 2023, and having "METHOD, ELECTRONIC DEVICE AND COMPUTER PROGRAM PRODUCT FOR DATA REPLICATION" as a title, the contents and teachings of which are herein incorporated by reference in their entirety.

TECHNICAL FIELD

Embodiments of the present disclosure relate to the field of computers, and more specifically, to a method, an electronic device, and a computer program product for data replication.

BACKGROUND

Data replication is an important feature of storage arrays and typically includes sync replication and async replication. Sync replication has a zero Recovery Point Objective (RPO), which means that there is no data loss, that is, the data backed up is identical to the source data. During sync replication, each host input/output operation or host IO needs to wait for completion at a remote location, thus resulting in degraded host IO performance and requiring low-latency networks. Sync replication is typically used in scenarios where data consistency and reliability is required, such as online transactions, because it can ensure that the data on all replicas is consistent. However, it degrades the performance because the source data volume must wait for all target data volumes to acknowledge the success of the operation before proceeding to the next operation.

Async replication means that after the source data volume executes an operation, it does not have to wait for the target data volume to acknowledge that the operation has been successfully executed before it can move on to the next operation. This means that the order of operations on the target data volume may be different from that of the source data volume, which may result in inconsistent data in some cases. However, async replication can improve performance because the source data volume can continue to execute the next operation without waiting for an acknowledgment. Async replication uses internal snapshots to periodically replicate data, not the latest data on the source data volume but the replicated snapshot data, so usually the RPO is long. If a short RPO is provided, frequent snapshot operations will be involved, which will lead to performance degradation on the source data volume.

SUMMARY OF THE INVENTION

Embodiments of the present disclosure provide a method, an electronic device, and a computer program product for data replication.

In one aspect of the present disclosure, a method for data replication is provided. The method includes: determining, based on a metadata log, whether an overlap exists between a target input/output operation or target IO and previous IOs, wherein the metadata log records metadata related to data replication; writing the target IO to a source data volume according to a determination that no overlap exists between the target IO and the previous IOs; replicating data within the range of the overlap from the source data volume to a data log according to a determination that the overlap exists between the target IO and the previous IOs, and writing the target IO to the source data volume after completion of the replicating; and replicating the target IO to a target data volume based on the metadata log and the data log.

In another aspect of the present disclosure, an electronic device is provided. The device includes a processing unit and a memory, wherein the memory is coupled to the processing unit and stores instructions. The instructions, when executed by the processing unit, perform the following actions: determining, based on a metadata log, whether an overlap exists between a target IO and previous IOs, wherein the metadata log records metadata related to data replication; writing the target IO to a source data volume according to a determination that no overlap exists between the target IO and the previous IOs; replicating data within the range of the overlap from the source data volume to a data log according to a determination that the overlap exists between the target IO and the previous IOs, and writing the target IO to the source data volume after completion of the replicating; and replicating the target IO to a target data volume based on the metadata log and the data log.

In still another aspect of the present disclosure, a computer program product is provided. The computer program product is tangibly stored on a non-transitory computer-readable medium and includes computer-executable instructions, the computer-executable instructions, when executed, causing a computer to perform the method or process according to the embodiments of the present disclosure.

The Summary of the Invention part is provided to introduce relevant concepts in a simplified manner, which will be further described in the Detailed Description below. The Summary of the Invention part is neither intended to identify key features or essential features of the present disclosure, nor intended to limit the scope of the embodiments of the present disclosure.

BRIEF DESCRIPTION OF THE DRAWINGS

The above and other features, advantages, and aspects of embodiments of the present disclosure will become more apparent in conjunction with the accompanying drawings and with reference to the following detailed description. Throughout the drawings, the same or similar reference numerals represent the same or similar elements.

DETAILED DESCRIPTION

Figure 1:
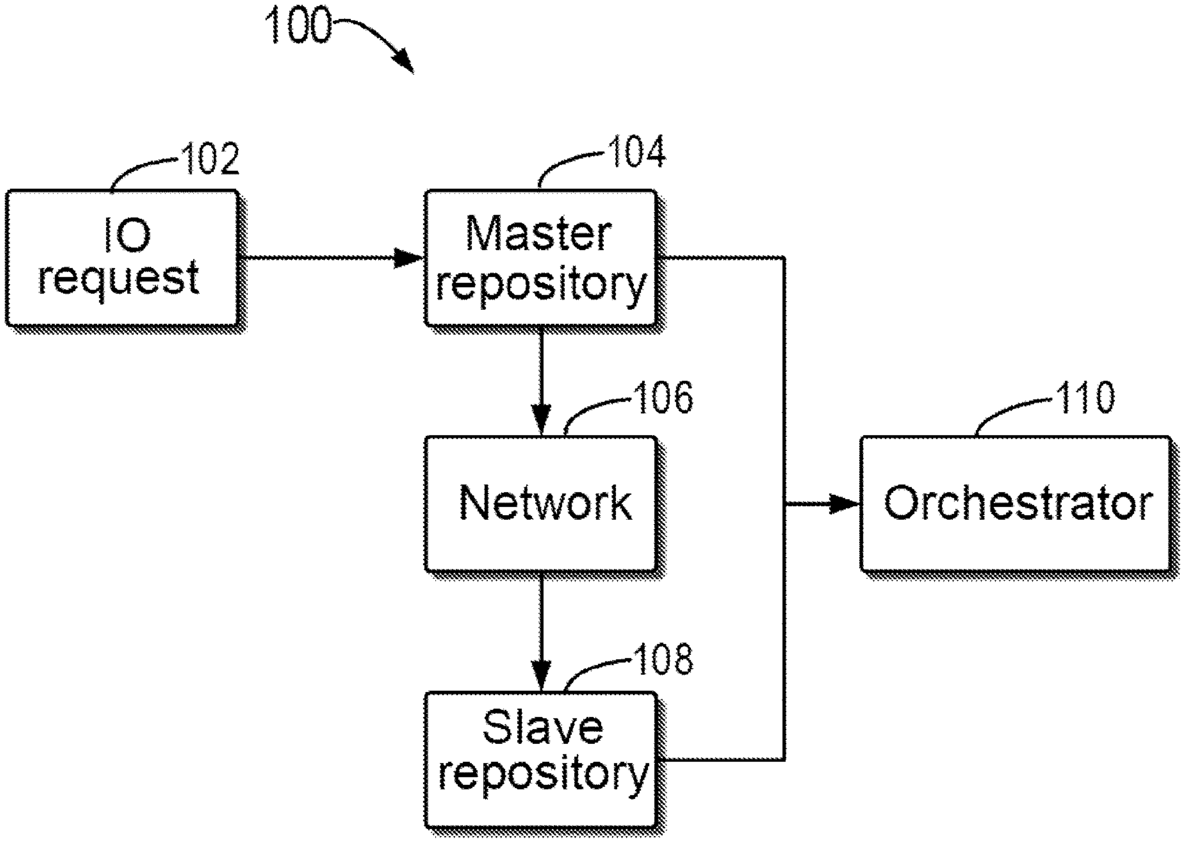
FIG. 1 illustrates a schematic diagram of an example environment in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated.

In addition, all specific numerical values herein are examples, which are provided only to aid in understanding, and are not intended to limit the scope.

Data replication for storage arrays typically includes sync replication and async replication. Sync replication can have a zero RPO, which means that there is no data loss, that is, the data backed up is identical to the source data, but it causes performance degradations for the host IO and requires low-latency network services. On the other hand, async replication means that after the source data volume executes an operation, it does not have to wait for the target data volume to acknowledge that the operation has been successfully executed before it can move on to the next operation, which can result in a long RPO. Semi-sync replication is a technical solution between sync replication and async replication, which can reduce the RPO while improving the performance of the host IO. At present, it is common to have semi-sync replication implemented based on sync replication, which requires splitting the host IO and using cached logs for remote IOs, but often requires a large number of cached logs to store the remote IOs. The other one is semi-sync replication implemented based on async replication, which, however, requires frequent replication snapshots to reduce the RPO and also cannot guarantee consistency in case of crashes.

To solve the above and other potential problems, the present disclosure provides a semi-sync replication solution based on metadata logs and data logs, which includes: determining whether an overlap exists between a target IO and previous IOs; writing the target IO to a source data volume if no overlap exists, and replicating data within the range of the overlap from the source data volume to a data log if the overlap exists, and then writing the target IO to the source data volume; and then replicating the target IO to a target data volume based on the metadata log and the data log. The technical solution of the present disclosure can significantly reduce the size of a log for storing a replicated IO while ensuring the consistency of data in case of crashes.

Basic principles and several example implementations of the present disclosure are illustrated below with reference to FIG. 1 through FIG. 7. It should be understood that these example embodiments are given only to enable those skilled in the art to better understand and thus implement the embodiments of the present disclosure, and are not intended to limit the scope of the present disclosure in any way.

FIG. 1 illustrates a schematic diagram of an example environment 100 in which embodiments of the present disclosure can be implemented. FIG. 1 includes an IO request 102, a master repository 104, a network 106, a slave repository 108, and an orchestrator 110. It should be understood that the numbers, the arrangement, and the processing process of devices illustrated in FIG. 1 are only examples, and that the example system may include different numbers of devices and processing processes that are arranged in different manners, and various additional elements, etc.

As shown in FIG. 1, when the IO request 102 arrives at the master repository 104, the master repository 104 first processes the IO request 102. The master repository 104 includes, but is not limited to: a hard disk drive (HDD), which is relatively slow but has a larger capacity and lower cost and is suitable for large amounts of non-real-time data storage; a solid state drive (SSD), which is a flash memory chip-based storage device that is much faster than a HDD but costs more and is suitable for scenarios that require high read and write speeds, for example, real-time data processing and high-performance computing; a storage class memory (SCM), which provides higher performance and persistence and is suitable for application scenarios that require large amounts of fast and persistent storage; a distributed file system, which distributes data across multiple nodes, thus enabling horizontal expansion of storage capacity and performance; object storage, which stores data with objects as units and is suitable for large-scale unstructured data storage; database storage, which is a storage solution for specific types of data, such as relational databases (e.g. MySQL, PostgreSQL, and Oracle) and NoSQL databases (e.g., MongoDB); and distributed block storage, which distributes data across multiple nodes while supporting node-independent data access and is suitable for virtualized and containerized environments.

After writing the IO request to the master repository 104, it is processed accordingly according to the configuration of the orchestrator 110. The functions of the orchestrator 110 include, but are not limited to: cluster management, which is responsible for monitoring, maintaining, and expanding the storage cluster and ensuring that the various nodes and services in the cluster are operating properly; resource allocation and scheduling, which dynamically allocates and schedules storage resources based on the load, performance, and availability requirements of the cluster; fault detection and recovery, which detects failures in the storage cluster and automatically triggers the recovery mechanism to ensure the persistence and availability of data; data replica management, which is responsible for managing replicas and redundancy of data to ensure the reliability and fault tolerance of data; and load balancing, which is achieved through a scheduling policy that spreads data and requests across different nodes in the cluster to improve performance and extensibility. If the orchestrator 110 is configured for sync replication, the storage system waits for replicated IOs to be written to the slave repository 108 before processing subsequent IO requests. If the orchestrator is configured for async replication, the master repository 104 continues to process subsequent IO requests without waiting for a response from the slave repository 108. It can be understood that there can be multiple slave repositories 108.

The master repository 104 may transfer data to the slave repository 108 over the network 106, where the network 106 includes, but is not limited to: TCP/IP, transfer control protocol (TCP) and Internet protocol (IP) being the most commonly used network protocols in distributed storage systems, which provide reliable, connection-oriented data transfer; user datagram protocol (UDP), UDP being a connectionless, best-effort data transfer protocol that offers lower latency and higher transfer efficiency than TCP/IP but does not guarantee reliable data transfer; remote direct memory access (RDMA), RDMA being a low-latency, high-throughput data transfer technology that allows data to be transferred directly from the memory of one computer to the memory of another computer without involving the CPU and operating system; HTTP/HTTPS, Hypertext Transfer Protocol (HTTP) and Hypertext Transfer Protocol Secure (HTTPS) being application-layer communication protocols that are typically used in Web-based distributed storage systems for data transfer between clients and servers; and gRPC, which is a high-performance, general-purpose remote procedure call (RPC) framework based on the HTTP/2 protocol and the Protocol Buffers serialization format, and can be used for inter-node communication and data transfer in distributed storage systems. In practical applications, a distributed storage system may choose appropriate transfer protocols and technologies based on performance, reliability, security, and latency requirements. Generally, storage systems use a combination of multiple protocols and technologies to meet different application scenarios and requirements.

Figure 2:
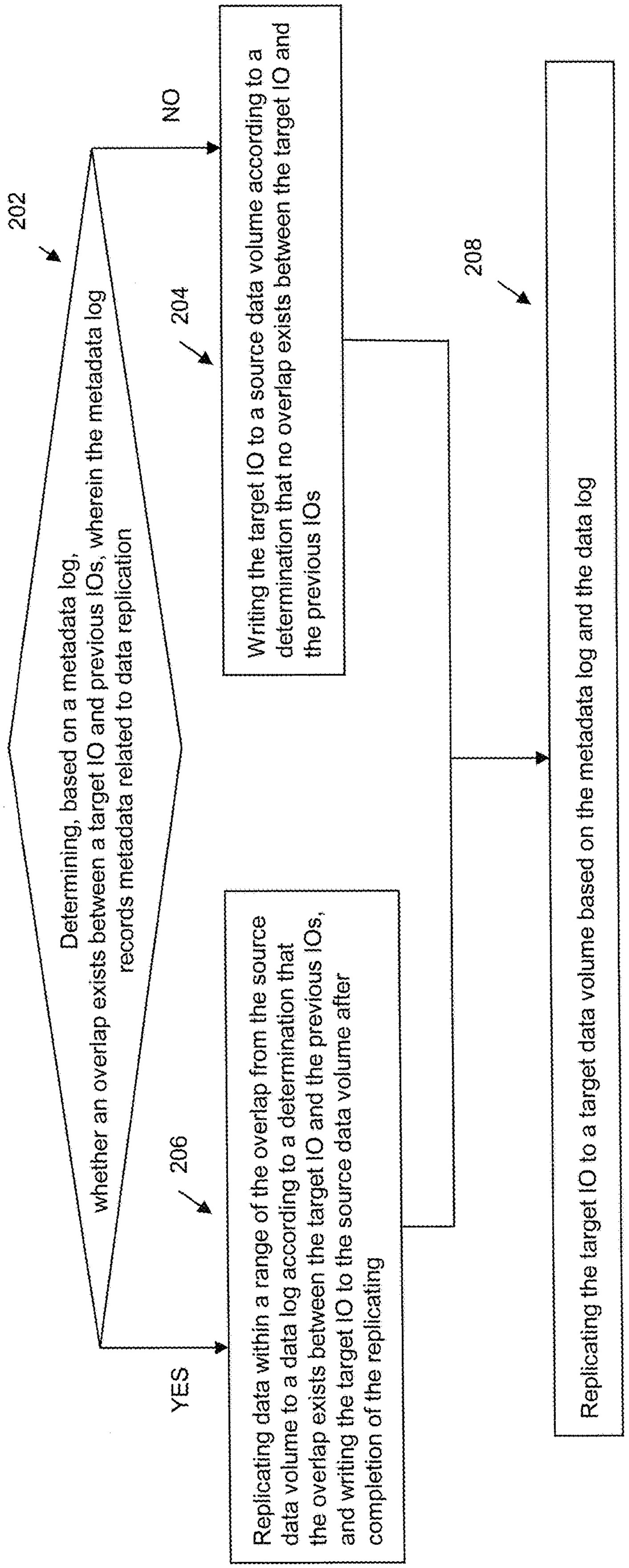
FIG. 2 illustrates a flowchart for data replication according to embodiments of the present disclosure.

FIG. 2 illustrates a flowchart 200 for data replication according to embodiments of the present disclosure. At block 202, it is determined, based on a metadata log, whether an overlap exists between a target IO and previous IOs, wherein the metadata log records metadata related to data replication. In some embodiments, in the metadata log, metadata for previous IOs, such as the offsets and lengths from the current IO, are recorded, for example, <0 KB. 8 KB>, <10 KB, 2 KB>, and <12 KB, 4 KB> are recorded in the metadata log, then when a target IO request arrives, it can be determined whether an overlap exists between the target IO and the previous IOs based on the offset and length of the target IO, and the range of the overlap can be determined. For example, if the metadata for the target IO is <6 KB. 8 KB>, then it can be determined that overlaps exist between the target IO and all of <0 KB, 8 KB>, <10 KB. 2 KB>, and <12 KB, 4 KB> of the previous IOs.

At block 204, the target IO is written to a source data volume according to a determination that no overlap exists between the target IO and the previous IOs. In some embodiments, according to a determination that no overlap exists between the target IO and the previous IOs, then the target IO can write the target IO directly to the source data volume, and since no overlap exists, then when the target IO is subsequently replicated to the target data volume, the data can be acquired directly from the source data volume. In such a processing manner, no additional log space is required to record data for the target IO, which can improve the storage efficiency, and there is also no need to generate snapshots because the metadata associated with the target IO is recorded in the metadata log, so the relevant metadata can be read from the metadata log during data replication so as to obtain from the source data volume the data to be replicated.

At block 206, data within the range of the overlap is replicated from the source data volume to a data log according to a determination that the overlap exists between the target IO and the previous IOs, and the target IO is written to the source data volume after completion of the replicating. Since the overlap exists between the target IO and the previous IOs, replicating only the data in the overlap portion to the data log can reduce the size of the data log and improve storage efficiency. In some embodiments, replicating the data within the range of the overlap from the source data volume to the data log can be performed using the xcpoy technique by which a leaf node in the data log is pointed to the data in the overlap portion and a new data block is allocated for the target IO. In such a processing manner, there is no actual data movement, thereby improving the efficiency of data replication.

At block 208, the target IO is replicated to a target data volume based on the metadata log and the data log. For example, the metadata for the target IO to be replicated, i.e., the offset and the length, is read from the metadata log, and then the corresponding data is read from the data log and/or the source data volume according to that offset and length, and the data is replicated to the target data volume to complete the data replication.

During the data replication process, metadata logs and data logs are utilized to store metadata and data related to IO requests, so it is only necessary to process IO requests locally without waiting for the status of the target data volume. At the same time, compared to recording all the data for IO requests, since the data logs only record logs of the overlap portion, it is possible to reduce the storage size of the data logs and improve storage efficiency. Even when the source data volume fails, it is still possible to recover data from metadata logs and data logs to the target data volume, thus reducing the RPO and ensuring consistency in case of crashes.

Figure 3:
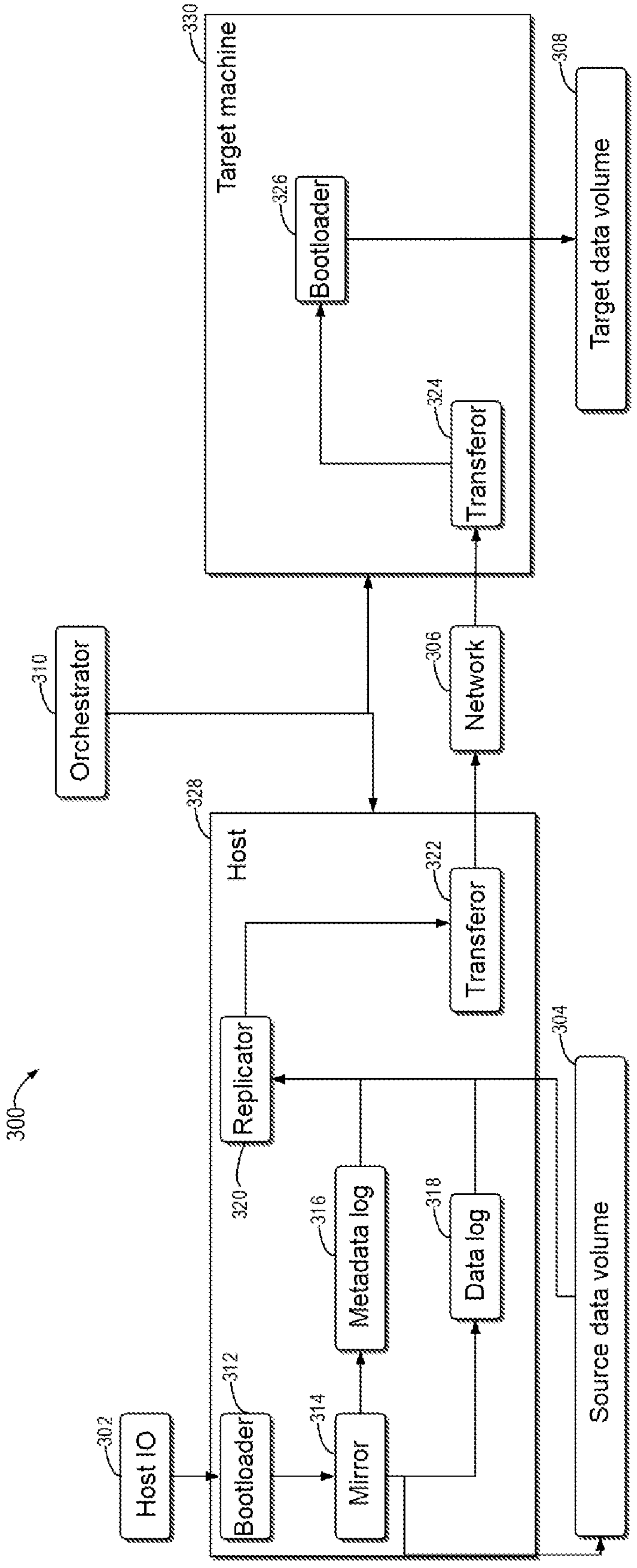
FIG. 3 illustrates a framework diagram for data replication according to embodiments of the present disclosure.

FIG. 3 illustrates a framework diagram 300 for data replication according to embodiments of the present disclosure. In FIG. 3, a host IO 302 (e.g., the IO request 102 as shown in FIG. 1) arrives at a host 328, then the host IO 302 is first booted through a bootloader 312, and then the host IO 302 is processed through a mirror 314 to obtain a local IO and a replicated IO, where the local IO is consistent with the host IO and the replicated IO changes depending on whether an overlap of data exists. In conjunction with block 202 of FIG. 2, it is first determined based on a metadata log 316 whether an overlap exists between the local IO and the previous IOs recorded in the metadata log 316. For example, <0 KB, 8 KB>, <10 KB, 2 KB>, and <12 KB, 4 KB> are recorded in the metadata log, then when a local IO request arrives, it can be determined whether an overlap exists between the local IO and the previous IOs based on the offset and the length of the local IO, and the range of the overlap can be determined. For example, if the metadata for the local IO is <6 KB, 8 KB>, then it can be determined that overlaps exist between the local IO and all of <0 KB, 8 KB>, <10 KB, 2 KB>, and <12 KB, 4 KB> of the previous IOs.

In conjunction with block 204 of FIG. 2, upon determining that no overlap exists between the local IO and the previous IOs, the local IO is written to the source data volume 304 (e.g., the master repository 104 as shown in FIG. 1) while the offset and the length of the replicated IO is recorded in the metadata log 316. Upon determining that no overlap exists between the local IO and the previous IOs, the offset and the length of the replicated IO recorded in the metadata log 316 are consistent with the offset and the length of the local IO. For example, if the metadata for the local IO is <0 KB, 8 KB>, then the metadata for the replicated IO recorded in the metadata log 316 is also <0 KB, 8 KB>. When subsequently sending the replicated IO to a target machine 330, the data to be read can be determined based on the metadata for the replicated IO.

In conjunction with block 206 of FIG. 2, data within the range of the overlap is replicated from the source data volume 304 to a data log 318 according to a determination that the overlap exists between the local IO and the previous IOs, and the local IO is written to the source data volume 304 after completion of the replicating. Since the overlap exists between the local IO and the previous IOs, writing the local IO directly to the source data volume 304 would result in overwriting the data of the previous IOs, which results in inconsistency of data between the source data volume 304 and the target data volume 308 at that moment, so the data of the overlap portion is recorded in the data log 318. In addition, recording only the data of the overlap portion can reduce the size of the data log 318 without having to use a large amount of space to store all the data. In the transfer of subsequent replicated IOs, it is also not necessary to frequently generate a large number of snapshots to record the data at each moment. Instead, the data at each moment can be directly obtained from the metadata log 316 and the data log 318, thereby ensuring the data consistency between the source data volume 304 and the target data volume 308.

Upon determining that the overlap exists between the local IO and the previous IOs, the metadata for the replicated IO in the metadata log 316 needs to record the offset and length of that replicated IO in the source data volume 304 and also the offset and length of that replicated IO in the data log 318. For example, <0 KB, 8 KB>, <10 KB, 2 KB>, and <12 KB, 4 KB> are recorded in the metadata log, then when a local IO request arrives, it can be determined whether an overlap exists between the local IO and the previous IOs based on the offset and length of the local IO, and the range of the overlap can be determined. For example, if the metadata for the local IO is <6 KB, 8 KB>, then it can be determined that overlaps exist between the local IO and all of <0 KB, 8 KB>, <10 KB. 2 KB>, and <12 KB, 4 KB> of the previous IOs. Then, the data at <6 KB, 8 KB> in the source data volume can be replicated (e.g., xcopy) to <0 KB. 8 KB> in the data log 318, in which case the metadata for that replicated IO is recorded in the metadata log as <6 KB, 8 KB, 0 KB, 8 KB>.

In conjunction with block 208, the replicated IO is replicated to the target data volume 308 based on the metadata log 316 and the data log 318. In some embodiments, the metadata log 316 can be implemented in the form of a ring-shaped queue and recorded at the tail of the metadata log 316 each time the latest replicated IO arrives. When replicating the replicated IO, a replicator 320 first takes the replicated IO to be replicated from the head of the metadata log 316 and then judges whether an overlap exists between that replicated IO and the subsequent IO to the metadata log 316, and if no overlap exists, the data is read based on the offset and length recorded in the metadata. If the overlap exists, the data will be read according to the offset and length recorded in the metadata, that is, from the data log 318 and the source data volume 304, respectively, and the obtained data will be merged as the data to be transferred.

The obtained data is sent by the replicator 320 to a transferor 322 of the host 328, and transferred, through a network 306, to a transferor 324 of the target machine 330, and finally written to the target data volume 308 through a bootloader 326. It can be understood that only one target machine 330 is illustrated in FIG. 3, but multiple target machines can be configured for the data replication process.

Figure 4:
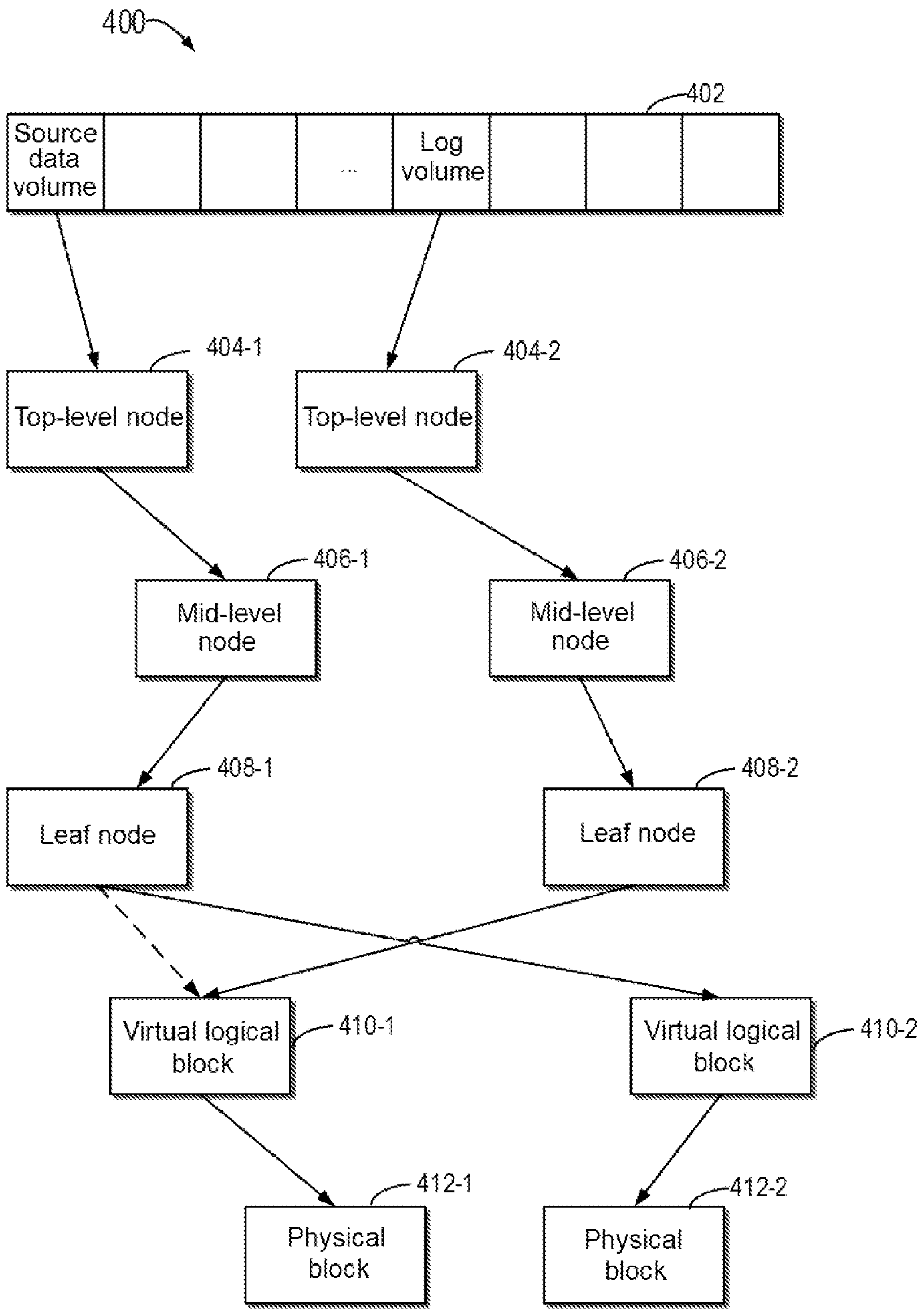
FIG. 4 illustrates a structural diagram of a data volume according to embodiments of the present disclosure.

FIG. 4 illustrates a structural diagram 400 of a data volume according to embodiments of the present disclosure, and a data volume 402 as shown in FIG. 4 is in a tree structure. There are source data volumes and log volumes on the data volume 402, including top-level nodes 404-1 and 404-2, mid-level nodes 406-1 and 406-2, and leaf nodes 408-1 and 408-2, where leaf nodes 408-1 and 408-2 point to virtual logical blocks 410-1 and 410-2, respectively, and virtual logical blocks 410-1 and 410-2 point to actual physical blocks 412-1 and 412-2, respectively. It can be understood that the numbers of various nodes, virtual logical blocks, and physical blocks illustrated here are only examples, and that there are greater numbers of nodes, virtual logical blocks, and physical blocks in practice.

In the architecture of the data volume 402 depicted in FIG. 4, in the event that data in the range of overlap need to be replicated from the source data volume to the data log (e.g., as shown in block 206 in FIG. 2), the xcopy technique is used, and it is only necessary to make the pointer of the leaf node 408-2 in the data log point to the virtual logical block 410-1, which corresponds to the physical block 412-1, and to change the pointer of the leaf node 408-1 of the source data volume from pointing to the virtual logical block 410-1 to pointing to the virtual logical block 410-2, which corresponds to the new physical block 412-2 allocated for the target IO. Using the xcopy technique, no actual data movement is required when replicating data in the range of the overlap from the source data volume to the data log, but only the pointers of the leaf nodes are changed, thus improving the efficiency of data replication.

Figure 5:
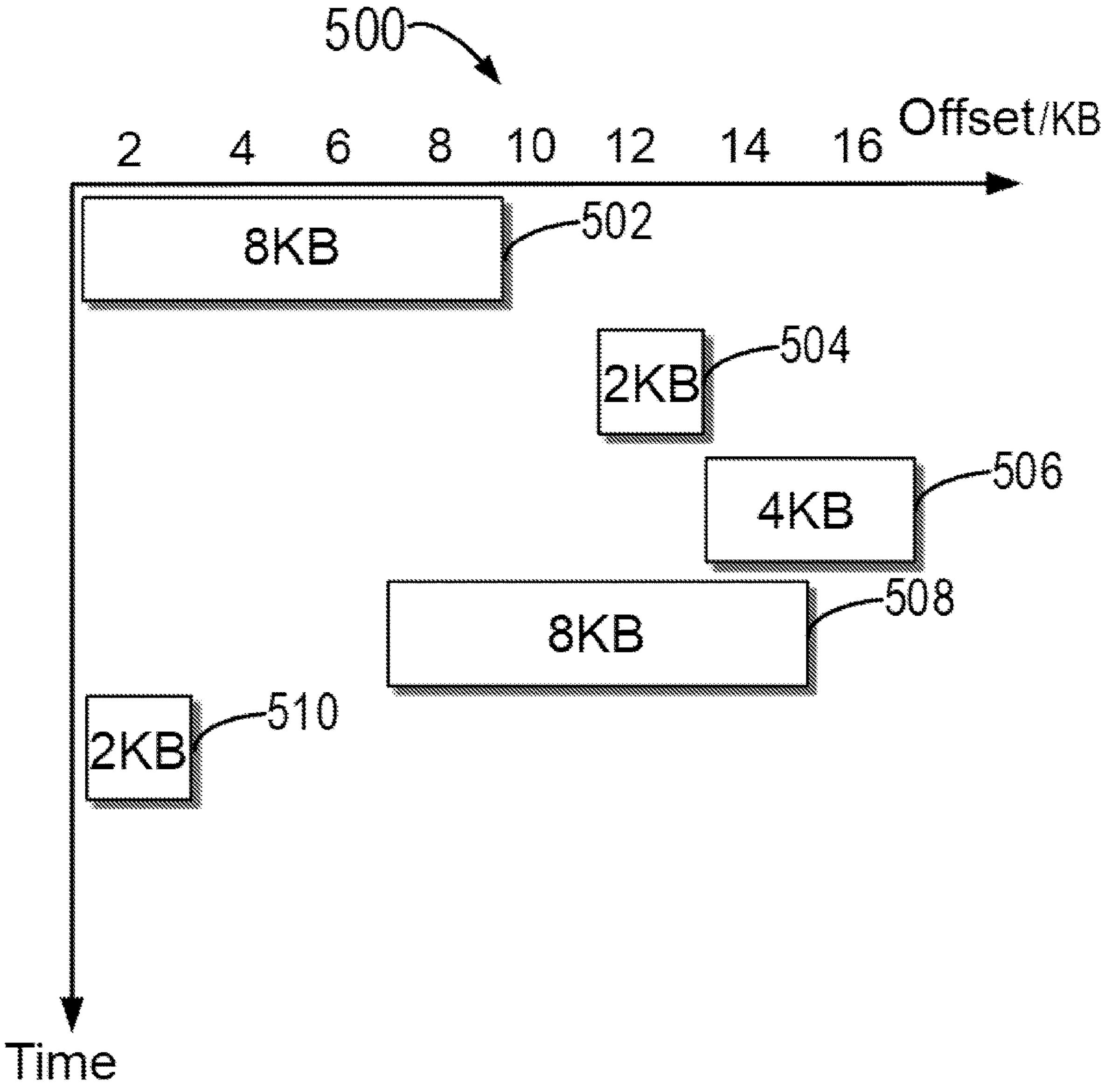
FIG. 5 illustrates a schematic diagram of a metadata log according to embodiments of the present disclosure.

FIG. 5 illustrates a schematic diagram 500 of the metadata log. As shown in FIG. 5, metadata 502 <0 KB. 8 KB>, 504<10 KB. 2 KB>, and 506<12 KB, 4 KB> for previous IOs are already recorded in the metadata log. For example, the metadata 502<0 KB, 8 KB> identifies that the metadata corresponds to a replicated IO with an offset of 0 KB on the source data volume and a length of 8 KB. It can be seen that no overlap exists between the metadata 502, 504, and 506, while there are overlaps between the metadata 508<6 KB. 8 KB> and all the metadata 502, 504, and 506. Then, the data in the range of the overlap needs to be replicated to the data log, for example, the data corresponding to the metadata 508 needs to be replicated to the <0 KB. 8 KB> range in the data log, then the metadata 508 is changed accordingly to <6 KB, 8 KB, 0 KB, 8 KB>, which indicate the offset and length of the replicated IO corresponding to the metadata 508 on the source data volume as well as the offset and length on the data log, respectively. Similarly, in the case where an overlap exists between the metadata 510<0 KB, 2 KB> and the metadata 502, the data in the range of the overlap needs to be replicated to the data log, and since <0 KB, 8 KB> in the data log is already occupied by the metadata 508, the metadata 510 is accordingly changed to <0 KB, 2 KB, 8 KB, 2 KB>, which indicate the offset and length of the replicated IO corresponding to the metadata 510 on the source data volume as well as the offset and length on the data log, respectively.

In this way, regardless of whether an IO overlap occurs, metadata and data for each IO can be guaranteed to be recorded to ensure data consistency at each moment, and even in the event of a data crash on the source data volume, the target data volume can be recovered by the logs recorded in the metadata log and the data log to ensure consistency in case of crashes. At the same time, since the metadata log only records metadata information and the data log only records data in overlap portions, the storage space for log recording can be saved and the storage efficiency can be improved.

Figure 6:
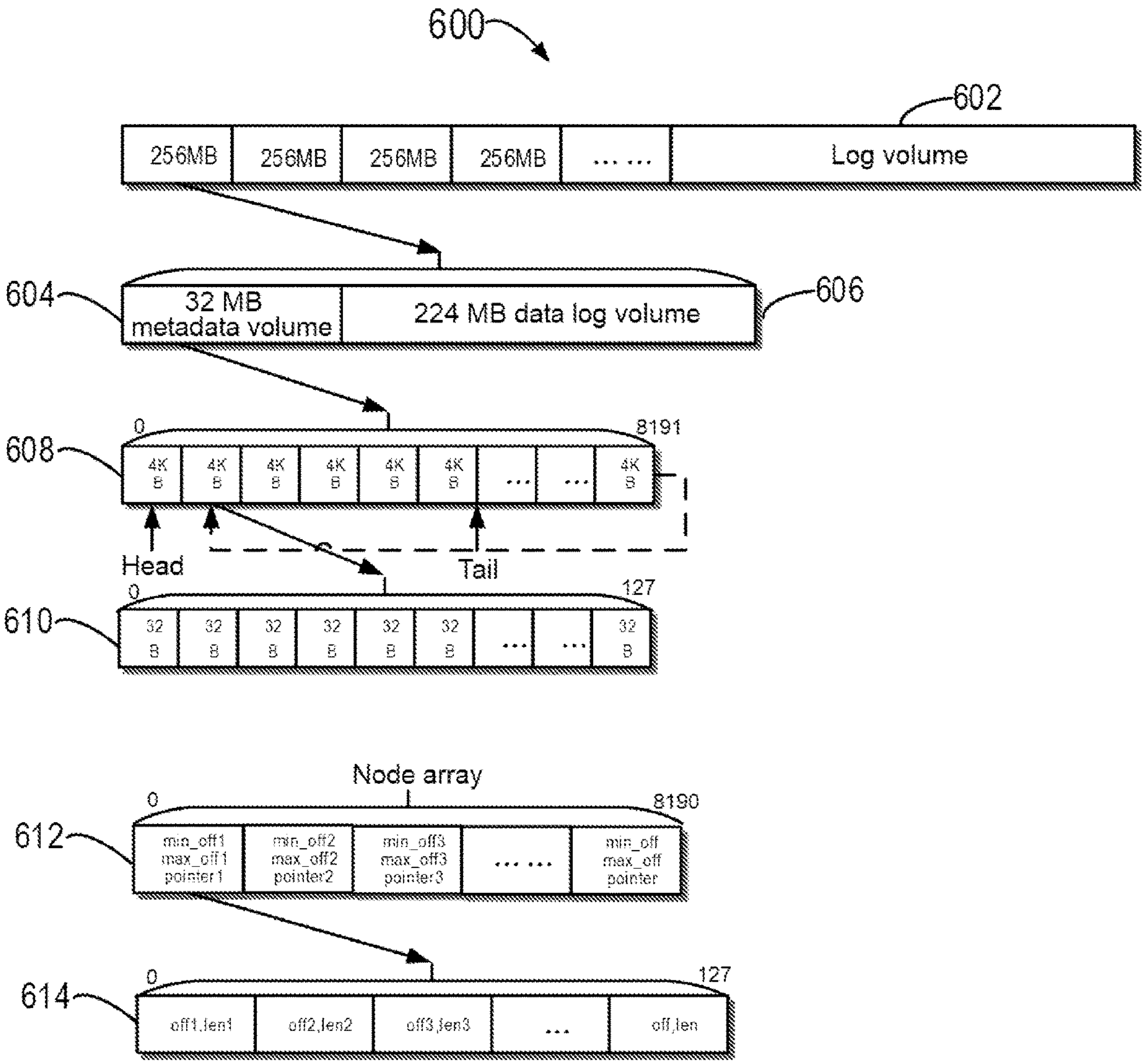
FIG. 6 illustrates a structural diagram of a log volume according to embodiments of the present disclosure.

FIG. 6 illustrates a structural diagram 600 of a log volume according to embodiments of the present disclosure. As shown in FIG. 6, a log volume 602 is divided in the unit of 256 MB of storage space, where the storage space is configurable and it can also be divided in the unit of other sizes of storage space. Each log volume 602 from the dividing includes a metadata volume (32 MB) 604 and a data log volume (224 MB) 606, and it can be understood that since the metadata log stores only metadata and the data log stores data within the range of overlap, the space for the data log volume 606 is larger than that for the metadata volume 604. The metadata volume 604 of size 32 MB is divided to obtain a ring-shaped queue 608 of metadata logs, in such a way that the number of writings to the log volume 602 per IO can be reduced. A 4 KB page in the persistent memory is used as a cache to temporarily store the metadata for the incoming replicated IO, and a B-tree is used to sort all records in the 4 KB persistent memory, and when 128 records are attained, they are written, in a unit of 4 KB page, to the ring-shaped queue 608 of metadata logs, and the 128 records are sorted using the B-tree and saved in a node array 612 in the convergence range.

In this way, each node in the node array 612 has a minimum offset (min_off), a maximum offset (max_off) and a pointer to the sorted 128 records, where min_off and max_off can be used to quickly detect whether the IO range is at this node, and if the IO range is beyond min_off and max_off, the node can be skipped and the process moves to the next node. Using the above cached data structure, the operation of detecting data overlap can be done in the memory without requiring additional log readings. In addition, such cached data come from the metadata log, and they can be reconstructed from the metadata log if the node crashes.

Figure 7:
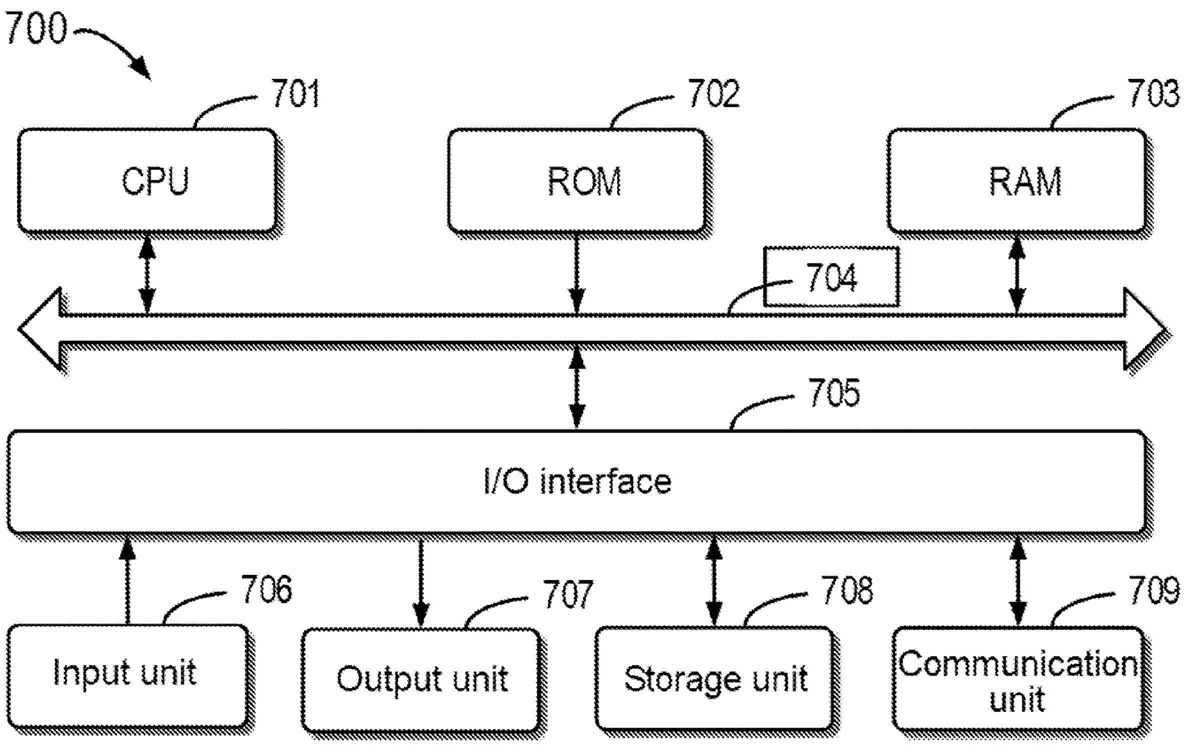
FIG. 7 illustrates a schematic block diagram of a device that can be used to implement the embodiments of the present disclosure.

FIG. 7 illustrates a schematic block diagram of a device 700 that can be used to implement the embodiments of the present disclosure. The device 700 may be a device or an apparatus described in the embodiments of the present disclosure. As shown in FIG. 7, the device 700 includes a central processing unit (CPU) 701 that may perform various appropriate actions and processing according to computer program instructions stored in a read-only memory (ROM) 702 or computer program instructions loaded from a storage unit 708 to a random access memory (RAM) 703. Various programs and data required for the operation of the device 700 may also be stored in the RAM 703. The CPU 701, the ROM 702, and the RAM 703 are connected to each other through a bus 704. An Input/Output (I/O) interface 705 is also connected to the bus 704.

A plurality of components in the device 700 are connected to the I/O interface 705, including: an input unit 706, such as a keyboard and a mouse; an output unit 707, such as various types of displays and speakers; a storage unit 708, such as a magnetic disk and an optical disc; and a communication unit 709, such as a network card, a modem, and a wireless communication transceiver. The communication unit 709 allows the device 700 to exchange information/data with other devices via a computer network, such as the Internet, and/or various telecommunication networks.

The various methods or processes described above may be performed by the processing unit 701. For example, in some embodiments, the method may be implemented as a computer software program that is tangibly included in a machine-readable medium, such as a storage unit 708. In some embodiments, part or all of the computer programs may be loaded and/or installed onto the device 700 via the ROM 702 and/or the communication unit 709. When the computer program is loaded into the RAM 703 and executed by the CPU 701, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transfer media (e.g., light pulses through fiber-optic cables), or electrical signals transferred through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transfer cables, fiber optic transfer, wireless transfer, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in one or any combination of more programming languages, including object-oriented programming languages and conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in a reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

The invention claimed is:

1. A method for data replication, comprising:

determining, based on a metadata log, whether an overlap exists between a target IO and previous IOs, wherein the metadata log records metadata related to data replication;

writing the target IO to a source data volume according to a determination that no overlap exists between the target IO and the previous IOs;

replicating data within the range of the overlap from the source data volume to a data log according to a determination that the overlap exists between the target IO and the previous IOs, and writing the target IO to the source data volume after completion of the replicating;

replicating the target IO to a target data volume based on the metadata log and the data log; and writing the metadata for the target IO to the metadata log, at least in part by:

in response to the determination that no overlap exists between the target IO and the previous IOs, writing a first offset and a first length of the target IO as the metadata to the metadata log, wherein the first offset and the first length indicate the offset and length of the target IO in the source data volume, respectively; and in response to the determination that the overlap exists between the target IO and the previous IOs, writing both i) the first offset and the first length, and ii) a second offset and a second length of the target IO as the metadata to the metadata log, wherein the second offset and the second length indicate the offset and length of the target IO within the data log, respectively.

2. The method according to claim 1, wherein replicating the target IO to the target data volume comprises:

obtaining a local IO and a replicated IO based on the target IO;

acquiring the metadata for the replicated IO from the metadata log;

determining whether an overlap exists between the replicated IO and a subsequent IO;

reading data from the source data volume according to the metadata based on a determination that no overlap exists;

reading the data from the source data volume and the data log according to the metadata based on a determination that the overlap exists; and replicating the data to the target data volume.

3. The method according to claim 1, wherein replicating the data within the range of the overlap to the data log, and writing the target IO to the source data volume after completion of the replicating comprises:

making a pointer of a leaf node in the data log point to the data within the range of the overlap; and making a pointer of a leaf node in the source data volume point to a newly allocated data block corresponding to the target IO.

4. The method according to claim 1, wherein reading the data from the source data volume based on the metadata comprises:

reading the data from the source data volume based on the first offset and the first length in the metadata.

5. The method according to claim 1, wherein reading the data from the source data volume and the data log based on the metadata comprises:

reading first data from the source data volume based on the first offset and the first length in the metadata;

reading second data from the data log based on the second offset and the second length in the metadata; and merging the first data and the second data as the data.

6. The method according to claim 5, further comprising:

writing a predetermined number of replicated IOs to portions of the metadata log, wherein the predetermined number of replicated IOs are sorted by the first offset of the metadata for the replicated IOs.

7. The method according to claim 6, further comprising:

recording a maximum first offset and a minimum first offset in the portions of the metadata log after the predetermined number of replicated IOs have been written to the portions of the metadata log.

8. The method according to claim 7, wherein determining whether the overlap exists between the target IO and the previous IOs comprises:

comparing the first offset in the metadata for the target IO with the maximum first offset and the minimum first offset in each of the portions of the metadata log to determine whether the overlap exists.

9. An electronic device, comprising:

a processor; and a memory coupled to the processor, wherein the memory has instructions stored therein which, when executed by the processor, cause the device to perform actions comprising:

determining, based on a metadata log, whether an overlap exists between a target IO and previous IOs, wherein the metadata log records metadata related to data replication;

writing the target IO to a source data volume according to a determination that no overlap exists between the target IO and the previous IOs;

replicating data within the range of the overlap from the source data volume to a data log according to a determination that the overlap exists between the target IO and the previous IOs, and writing the target IO to the source data volume after completion of the replicating;

replicating the target IO to a target data volume based on the metadata log and the data log; and writing the metadata for the target IO to the metadata log, at least in part by:

in response to the determination that no overlap exists between the target IO and the previous IOs, writing a first offset and a first length of the target IO as the metadata to the metadata log, wherein the first offset and the first length indicate the offset and length of the target IO in the source data volume, respectively; and in response to the determination that the overlap exists between the target IO and the previous IOs, writing both i) the first offset and the first length, and ii) a second offset and a second length of the target IO as the metadata to the metadata log, wherein the second offset and the second length indicate the offset and length of the target IO within the data log, respectively.

10. The electronic device according to claim 9, wherein replicating the target IO to the target data volume comprises:

obtaining a local IO and a replicated IO based on the target IO;

acquiring the metadata for the replicated IO from the metadata log;

determining whether an overlap exists between the replicated IO and a subsequent IO;

reading data from the source data volume according to the metadata based on a determination that no overlap exists;

reading the data from the source data volume and the data log according to the metadata based on a determination that the overlap exists; and replicating the data to the target data volume.

11. The electronic device according to claim 9, wherein replicating the data within the range of the overlap to the data log, and writing the target IO to the source data volume after completion of the replicating comprises:

making a pointer of a leaf node in the data log point to the data within the range of the overlap; and making a pointer of a leaf node in the source data volume point to a newly allocated data block corresponding to the target IO.

12. The electronic device according to claim 1, wherein reading the data from the source data volume based on the metadata comprises:

reading the data from the source data volume based on the first offset and the first length in the metadata.

13. The electronic device according to claim 9, wherein reading the data from the source data volume and the data log based on the metadata comprises:

reading first data from the source data volume based on the first offset and the first length in the metadata;

reading second data from the data log based on the second offset and the second length in the metadata; and merging the first data and the second data as the data.

14. The electronic device according to claim 13, wherein the actions further comprise:

writing a predetermined number of replicated IOs to portions of the metadata log, wherein the predetermined number of replicated IOs are sorted by the first offset of the metadata for the replicated IOs.

15. The electronic device according to claim 14, wherein the actions further comprise:

recording a maximum first offset and a minimum first offset in the portions of the metadata log after the predetermined number of replicated IOs have been written to the portions of the metadata log.

16. A computer program product having a non-transitory computer readable medium which stores a set of instructions to perform data replication; the set of instructions, when carried out by computerized circuitry, causing the computerized circuitry to perform a method of:

determining, based on a metadata log, whether an overlap exists between a target IO and previous IOs, wherein the metadata log records metadata related to data replication;

writing the target IO to a source data volume according to a determination that no overlap exists between the target IO and the previous IOs;

replicating data within the range of the overlap from the source data volume to a data log according to a determination that the overlap exists between the target IO and the previous IOs, and writing the target IO to the source data volume after completion of the replicating;

replicating the target IO to a target data volume based on the metadata log and the data log; and writing the metadata for the target IO to the metadata log, at least in part by:

in response to the determination that no overlap exists between the target IO and the previous IOs, writing a first offset and a first length of the target IO as the metadata to the metadata log, wherein the first offset and the first length indicate the offset and length of the target IO in the source data volume, respectively; and in response to the determination that the overlap exists between the target IO and the previous IOs, writing both i) the first offset and the first length, and ii) a second offset and a second length of the target IO as the metadata to the metadata log, wherein the second offset and the second length indicate the offset and length of the target IO within the data log, respectively.

* * * * *